United States Patent [19]
Pinsky et al.

[11] 3,819,566
[45] June 25, 1974

[54] PREPARATION OF NACREOUS PIGMENTED PLASTIC OBJECTS

[75] Inventors: Jules Pinsky, Scarborough; Carl J. Rieger, Yorktown Heights; Elmer N. Hokanson, Croton, all of N.Y.

[73] Assignee: The Mearl Corporation, Ossining, N.Y.

[22] Filed: Dec. 1, 1971

[21] Appl. No.: 203,855

[52] U.S. Cl. ......... 260/42.14, 106/291, 106/308 M, 260/37 PC, 260/118.17, 260/42.46
[51] Int. Cl. ...................... C08f 45/04, C08g 51/04
[58] Field of Search ......... 260/41 B, 41.5 R, 37 PC; 106/300, 308 Q, 291, 308 M

[56] References Cited
UNITED STATES PATENTS

| | | | |
|---|---|---|---|
| 3,087,828 | 4/1963 | Linton | 106/303 |
| 3,503,922 | 3/1970 | Carton | 260/41 |
| 3,582,384 | 6/1971 | Belde et al. | 106/300 |

OTHER PUBLICATIONS

Renfrew et al., Polythene, 1957, Kiffe & Sons Limited, London, pages 291 to 299, TP986.056R41960.

*Primary Examiner*—Morris Liebman
*Assistant Examiner*—J. H. Derrington
*Attorney, Agent, or Firm*—Ostrolenk, Faber, Gerb & Soffen

[57] ABSTRACT

The surface stripping of titanium dioxide coated mica platelets in plastic is minimized by the use of a low molecular weight ethylene polymer.

12 Claims, No Drawings

PREPARATION OF NACREOUS PIGMENTED PLASTIC OBJECTS

BACKGROUND OF THE INVENTION

The pigment particles in nacreous pigments are transparent platelets of high refractive index. Such platelets readily orient along flow planes and assume positions parallel to one another when they are incorporated in a thermoplastic material by extrusion, injection molding and the like. Each platelet behaves like a tiny transparent mirror which reflects part and transmits part of the incident light. When the plastic medium is sufficiently transparent, incident light is simultaneously reflected from platelets at different depths giving an appearance of a pearly luster.

Titanium dioxide coated mica platelets are among the most popular and useful of the nacreous pigments. The pigment particle is essentially a three-layer sandwich structure having a mica center between two layers of titanium dioxide. The particle derives its plate-like shape from the mica and its high refractive index from the titanium dioxide layers. Optically, the particle behaves like two platelets of titanium dioxide, inasmuch as the mica makes a negligible contribution to the reflection from the particle.

Each titanium dioxide layer is composed of crystals less than 0.1 micron in diameter. Individually, the crystals are so small that they do not scatter light. The titanium dioxide layer therefore behaves optically like a continuous film. When the optical thickness, i.e., the product of the geometric thickness and refractive index, is in the range of 80–150 nanometers (nm), the reflection of the titanium dioxide films is essentially white, and the pigment is a white pearl pigment. A $TiO_2$ layer with an optical thickness of about 200 nm has a yellow reflection and the color of the pigment is yellow or gold. Higher optical thicknesses produce other reflection colors, e.g., about 250 nm — magenta or red reflection; about 310 nm — blue reflection; about 360 nm — green reflection.

Any section of the titanium dioxide layer which is dislodged or "stripped" from the mica tends to break up into particles which, although small, are sufficiently large to scatter light in all directions thereby decreasing the directional, specular character required for nacreous luster. Additionally, no reflection takes place at the exposed mica surface because the refractive index of mica (about 1.58) is close to the refractive index of most plastic media (about 1.50–1.59) in which the nacreous pigments are employed. As a result, the nacreous quality or pearly luster of the pigment is diminished.

When nacreous pigments are incorporated into plastics and when the plastics are further processed, the plastic composition is subjected to relatively high shear forces. Under such conditions, a minor proportion of the $TiO_2$ surface film is stripped from the mica platelets. In general, this action involves from 5%–15% of the total coated area, that is, both broad surfaces of the mica platelet. Consequently, the nacreous luster of the finished plastic articles is muted.

Accordingly, it is the object of this invention to provide a process for incorporating titanium dioxide coated mica nacreous pigments into plastics with a minimum amount of stripping and to provide plastic objects having an increased nacreous luster. These and other objects of the invention will become apparent to those skilled in the art from the following detailed description.

SUMMARY OF THE INVENTION

This invention relates to the incorporation of titanium dioxide coated mica nacreous pigments in plastics to produce plastic objects having a pearly luster. More specifically, the invention relates to an improved method for the incorporation of such pigments in plastics with a minimum degree of stripping of the titanium dioxide from the mica by employing a low molecular weight ethylene polymer.

DESCRIPTION OF THE PREFERRED EMBODIMENTS

In accordance with the present invention, titanium dioxide coated mica nacreous pigments are incorporated in a plastic with the aid of a low molecular weight ethylene polymer. The titanium dioxide coated mica is known in the art and can be prepared by any of the known processes, such as those described in U.S. Pat. Nos. 3,087,828 and 3,437,515.

The plastics employed in the present invention are the clear or translucent thermoplastic resins. Such resins can be prepared by polymerizing ethylenically unsaturated monomers. Typical materials include the homopolymers and copolymers of unsaturated aliphatic, cycloaliphatic and aromatic hydrocarbons of 2 to about 8 carbon atoms per molecule. Thus, suitable monomers include ethylene, propylene, butene, pentene, octene, 2-methyl propene-1, butadiene, isoprene, styrene, methyl styrene and the like. Block copolymers and graft copolymers, such as the graft copolymer of a polybutadiene with styrene and acrylonitrile, are also suitable. Other suitable plastics include vinyl polymers and copolymers such as polyvinyl acetate, polyvinyl chloride and polyvinylidene chloride. Acrylic acid and its derivatives such as methylacrylate, ethylacrylate, methacrylic acid, methyl methacrylate, ethyl methacrylate, acrylamide, methacrylamide, and the like are also suitable monomers. Other thermoplastic resins in which the nacreous pigments may be incorporated include polycarbonate, acrylonitrile and methacrylonitrile.

The low molecular weight ethylene polymers employed in the present invention have molecular weights in the range of about 500–10,000, Brookfield viscosities at 140° C. of about 10–10,000 centipoises, and densities of about 0.88–0.99. Preferably, such additives have a molecular weight of about 1,000–5,000, Brookfield viscosities at 140° C. of about 100–600, and densities of about 0.90–0.95. In contrast to such low molecular weight additives, low density polyethylene as used, for example, in the manufacture of flexible bottles and tubes, has a molecular weight of about 12,000–21,000 and a viscosity at 140° C. of about 100,000–68,000,000 centipoises. The ethylene polymers employed in the present invention include ethylene homopolymers and copolymers with such co-monomers as vinyl acetate and the like.

The low molecular weight ethylene polymers as such are known and have been recommended for facilitating the rapid and uniform dispersion of pigments into polyolefins, polyvinyl chloride and other thermoplastics. However, such low molecular weight ethylene polymers have not heretofore been used to assist the dispersion of titanium dioxide coated mica pigments and, in contrast to other known dispersants, the low molecular weight ethylene polymers minimize stripping of the titanium dioxide from the mica.

In preparing the molded plastic object of the present invention, the nacreous pigment, plastic and low molecular weight ethylene polymer additive are compounded according to techniques known in the art. For example, the low molecular weight additive can first be mixed with the titanium dioxide coated mica pigment by use of a tumbler, ribbon blender, or other familiar types of blending equipment. The mixture is thereafter blended with the appropriate plastic and incorporated therein with the aid of the usual type of equipment such as a Banbury mill, extruder, two-roll mill, and the like. Alternatively, the titanium dioxide coated mica pigment and the low molecular weight ethylene polymer can be individually blended into the plastic either simultaneously or successively. While a desirable technique is to blend the pigment with the plastic and then add the low molecular weight ethylene polymer, the reverse procedure is also effective.

Another typical procedure is to first produce a concentrate of pigment in plastic by means of a Banbury mill or continuous mixer. The concentrate is granulated or pelletized and then dry-tumbled with additional clear plastic or metered into a stream of plastic and subjected to the further mechanical working in screw extruders, injection molder or similar mechanical devices to achieve the desired shape, such as a film, sheet, rod, bottle, tube, lipstick case, comb, and the like.

In general, the titanium dioxide coated mica is employed in an amount of about 0.025-9.0% based on the weight of the plastic and the low molecular weight additive is about 0.01-7.5% based on the weight of the plastic. When the pigment and additive are pre-mixed, the mixture is preferably added to the plastic at a concentration of about 0.1-10% based on the weight of the plastic, and the ratio of additive to pigment in the mixture is about 1:9 to 3:1, preferably about 1:2 to 2:1. When the pigment and additive are added separately, the concentration of the titanium dioxide coated mica is preferably about 0.1-6% and that of the low molecular weight ethylene polymer additive of about 0.1% to about 3%, both percentages based on the weight of the plastic.

The very high shear forces generated during the preparation of the nacreous objects produces stripping of a proportion of the titanium dioxide coating from the mica. The use of the low molecular weight ethylene polymer in accordance with this invention reduces the degree of stripping, for example, from the range of 5-15% to a range of about 1-5% with a very significant enhancement of the pearl luster in the final plastic object.

The following Examples are presented to further illustrate the invention but are not intended to limit it. Unless otherwise specified throughout this specification and claims, all temperatures are in degrees centigrade and all parts and percentages are by weight.

In the following Examples, the degree of stripping was determined by visual measurement with the aid of a reflection microscope at a magnification of 1000x.

EXAMPLE 1
INCORPORATION OF PEARL REFLECTING $TiO_2$ COATED MICA IN HIGH DENSITY POLYETHYLENE

As a Control, a white pearl reflecting titanium dioxide coated mica pigment was incorporated in high density polyethylene (density 0.950; melt index 0.4) by first preparing a concentrate containing 10% pigment and 90% high density polyethylene in a Banbury mill. After granulation, the concentrate granules were blended with additional high density polyethylene in a ratio of 10 parts concentrate to 90 parts polyethylene in the Banbury mill. The resulting plastic material contained 1% pigment. The plastic material was formed into compression-molded discs, approximately 25 mils thick, and the degree of surface stripping was determined. The average degree of stripping was found to be 15%.

The foregoing procedure was repeated except that various quantities of a low molecular weight polyethylene (molecular weight 3,500; density 0.930; Brookfield viscosity of 350 centipoises at 140°C.) was first mixed with the titanium dioxide coated mica pigment. The quantity of additive-pigment blend was adjusted so that the high density polyethylene concentrate in each instance contained 10% pigment. The concentration was then reduced to 1% pigment and compression-molded discs were prepared as described above. Table I reports the various additive-pigment blends and the resulting degree of stripping.

TABLE I

| Additive-Pigment Blend | | |
|---|---|---|
| Additive, parts | Pigment, parts | Percentage Stripping |
| 2.5 | 10 | 5.0 |
| 10 | 10 | 4.0 |
| 15 | 10 | 2.5 |

The use of the low molecular weight polyethylene additive reduced the degree of stripping from 15% in the Control to 2.5-5.0%, depending on the concentration of the additive.

EXAMPLE 2
INCORPORATION OF PEARL REFLECTING $TiO_2$ COATED MICA IN HIGH DENSITY POLYETHYLENE

As a Control procedure, a concentrate containing 40 parts pearl reflecting $TiO_2$ coated mica and 60 parts of the high density polyethylene of Example 1 was prepared in a Banbury mill. The resulting mass was granulated and mixed with additional high density polyethylene pellets in a ratio of 2.5 parts:97.5 parts. Blow-molded bottles containing 1% pigment were prepared from the resulting mixture. Although the dispersion was good, the pearl luster was only fair. The degree of stripping was 15%.

The foregoing was repeated except that 10 parts of the high density polyethylene in the concentrate were replaced with the low molecular weight polyethylene additive of Example 1. The bottles made with this concentrate had a much higher pearl luster than the Control, and the degree of stripping was only 3%.

EXAMPLE 3

INCORPORATION OF PEARL REFLECTING TiO$_2$ COATED MICA IN LOW DENSITY POLYETHYLENE

The Control preparation in this Example was performed by tumbling 1 part of a white pearl-reflecting TiO$_2$ coated mica pigment and 98.9 parts low density polyethylene (density 0.92; melt index 2.0) which had previously been wet with 0.1 part of dioctyl phthalate. The mixture was fed into the hopper of a 2" extruder fitted with a blow-molding head. The resulting bottles displayed a modest pearl luster but it was evident that the dispersion of the pigment was very poor since many large specks of pigment could be observed. Microscopic observation showed that the dispersed pigment had suffered approximately 10% stripping.

The foregoing was repeated except that the TiO$_2$ coated mica pigment was first blended with an equal weight of the low molecular weight polyethylene additive of Example 1. The molding mixture was 2 parts of the additive-pigment mixture and 97.9 parts of the low density polyethylene which had previously been wet by 0.1 part dioctyl phthalate. The blown, low density polyethylene bottles had considerably higher pearl luster than those of the Control. The number of specks was reduced and there was an overall greater uniformity, showing that the additive had improved dispersion. The pigment particles were seen by microscopic examination to have only 2% stripping.

EXAMPLE 4

INCORPORATION OF GOLD REFLECTING TiO$_2$ COATED MICA IN POLYPROPYLENE

As a Control, 1.5% gold reflecting TiO$_2$ coated mica was blended with 98.4% polypropylene (density 0.904; melt flow 4.0) which had previously been wet with 0.1% mineral oil. The mixture was fed to a hopper of an apparatus for the making of blow-molded bottles. The resulting bottles had a pleasing gold luster and microscopic examination revealed that the degree of stripping was about 8%.

The foregoing preparation was repeated except that the TiO$_2$ coated mica pigment was first blended with half its weight of a low molecular weight ethylene homopolymer having a molecular weight of 1,500, a density of 0.91 and a viscosity (Brookfield) of 145 cps at 140° C. The pigment-additive mixture was blended with the polypropylene as described above except that the quantity of pigment-additive mixture was adjusted so as to have 1.5% pigment in the finished bottle. The blow-molded bottles in this instance had a higher luster than those of the Control and a more intense gold color. The degree of stripping as determined by microscope was only 1%.

EXAMPLE 5

BLUE REFLECTING TiO$_2$ COATED MICA IN RIGID POLYVINYL CHLORIDE

2% of a blue reflecting TiO$_2$ coated mica pigment was dry-blended with 98 parts of polyvinyl chloride molding powder. Blow-molded bottles were prepared having a soft blue pearl luster. The degree of stripping in this Control preparation was 12%.

The foregoing preparation was repeated except that the TiO$_2$ coated mica pigment was first blended with twice its weight of a low molecular weight oxidized ethylene homopolymer having a molecular weight of 2,000, a density of 0.93 and a Brookfield viscosity at 140° C. of 200 cps. Blow-molded, rigid, polyvinyl chloride bottles were prepared containing 2% pigment. The blue color was more intense and the luster higher than that of the Control. The degree of stripping was observed to have been reduced to about 3%.

EXAMPLE 6

SEQUENTIAL ADDITION--PIGMENT ADDED FIRST

The procedure of Example 3 was modified by first blending 1 part of the white pearl reflecting TiO$_2$ coated mica pigment with 98 parts of the low density polyethylene pellets. Thereafter, 1 part of the low molecular weight polyethylene was blended with the nacreous pigment-plastic blend. Blow-molded bottles were prepared which were comparable in the degree of dispersion with those bottles made in Example 3 with the pre-blended pigment-additive mixture. Stripping was 2%.

EXAMPLE 7

SEQUENTIAL ADDITION--LOW MOLECULAR WEIGHT ETHYLENE POLYMER ADDED FIRST

The procedure of Example 4 was modified by blending the low molecular weight polyethylene additive with the low density polyethylene, and then adding and blending the TiO$_2$ coated mica pigment. The resulting bottles were slightly poorer in uniformity of dispersion and exhibited a slightly greater degree of specks than the bottles of Examples 3 and 6, but were much freer of specks than the Control preparation of Example 3. The degree of stripping was 3%.

EXAMPLE 8

INCORPORATION OF PEARL REFLECTING TiO$_2$ COATED MICA IN ACRYLONITRILE COPOLYMER

As a control preparation, a white pearl reflecting TiO$_2$ coated mica pigment was incorporated into an acrylonitrile copolymer, Barex 210, of the type specified in U.S. Pat. No. 3,426,102, and having a melt index of 4.0 g/10 min., a specific gravity of 1.15 g/cc, and a heat deflection point at 66 psi of 165° F. One part of pigment was tumbled with 98.9 parts of acrylonitrile copolymer pellets, which had previously been wet with 0.1 part of dioctyl phthalate. The mixture was fed to the hopper of a 2" extruder fitted with a blow-molding head. The resulting bottles displayed a modest pearl luster and it was evident that the dispersion of the pigment was very poor and non-uniform, with many large pigment agglomerates visible. Microscopic examination showed that the dispersed pigment had suffered approximately 13% stripping.

The foregoing procedure was repeated except that the TiO$_2$ coated mica pigment was first blended with an equal weight of a low molecular weight ethylene-vinyl acetate copolymer containing about 14% vinyl acetate and having a molecular weight of 3,000, a density of 0.92 and a Brookfield viscosity of 3,000 cps at 140° C. The molding mixture consisted of 2 parts of the additive-pigment mixture and 97.9 parts of the acrylonitrile copolymer which was first wet with 0.1 part dioctyl phthalate. The blown bottles had considerably higher luster than the Control bottles. The number of agglomerates was greatly reduced and there was overall greater uniformity, showing that the additive had improved dispersion. Stripping of the pigment particles was observed to be only 3%.

The use of the low molecular weight ethylene polymer in conjunction with physical mixtures of plastics and $TiO_2$ coated mica nacreous pigments enhances the pearlescent luster of the resulting molded objects. This result is particularly unexpected because the use of such ethylene polymers with other $TiO_2$ pigments provides a good dispersion of the pigment in the plastic, but does not otherwise enhance the appearance of the plastic articles.

Various changes and modifications can be made in the process of this invention without departing from the spirit and scope thereof. The various embodiments disclosed herein serve to further illustrate the invention but are not intended to limit it.

We claim:

1. A method for minimizing the degree of surface stripping of titanium dioxide coated mica nacreous pigments when incorporated in a thermoplastic resin which comprises admixing about 0.025–9% based on said resin of said nacreous pigment, said resin, and about 0.01–7.5% based on said resin of a low molecular weight ethylene polymer having a molecular weight of about 500 to 10,000, a Brookfield viscosity at 140° C. of about 10 to 10,000 cps and a density of about 0.88–0.99.

2. The process of claim 1 wherein the low molecular weight ethylene polymer has a molecular weight of about 1000 to 5000, a Brookfield viscosity at 140° C. of about 100 to 600 cps and a density of about 0.90–0.95.

3. The process of claim 1 wherein the nacreous pigment and low molecular weight ethylene polymer are admixed and thereafter said mixture is admixed with the resin.

4. The process of claim 1 wherein the resin is selected from the group consisting of polyolefins, polyvinyl chloride and acrylonitrile copolymers.

5. The process of claim 1 wherein the low molecular weight ethylene polymer is an ethylene homopolymer or an ethylene-vinyl acetate copolymer.

6. A composition for incorporating nacreous pigments into thermoplastic resins comprising in admixture, a titanium dioxide coated mica nacreous pigment and a low molecular weight ethylene polymer having a molecular weight of about 500 to 10,000, a Brookfield viscosity at 140° C. of about 10 to 10,000 cps and a density of about 0.88–0.99, in a ratio of 9:1 to 1:3.

7. The composition of claim 6 wherein the low molecular weight ethylene polymer has a molecular weight of about 1,000–5,000, a Brookfield viscosity at 140° C. of about 100–600 centipoises, and a density of about 0.90–0.95.

8. The composition of claim 6 wherein the ethylene polymer is an ethylene homopolymer or an ethylene-vinyl acetate copolymer.

9. The composition of claim 6 wherein the ratio of ethylene polymer to nacreous pigment is about 1:2 to 2:1.

10. A composition comprising in admixture, a thermoplastic resin, about 0.025–9% based on said resin of a titanium dioxide coated mica nacreous pigment, and about 0.01–7.5% based on said resin of a low molecular weight ethylene polymer having a molecular weight of about 500 to 10,000, a Brookfield viscosity at 140° C. of about 10 to 10,000 cps and a density of about 0.88–0.99.

11. The composition of claim 10 wherein the resin is selected from the group consisting of polyolefins, polyvinyl chloride and acrylonitrile copolymers and wherein the low molecular weight ethylene polymer is polyethylene or ethylene-vinyl acetate copolymer.

12. The composition of claim 10 wherein the low molecular weight ethylene polymer has a molecular weight of about 1000 to 5000, a Brookfield viscosity at 140° C. of about 100 to 600 cps and a density of about 0.90–0.95.

* * * * *